United States Patent
Hatatani et al.

(10) Patent No.: US 7,599,151 B2
(45) Date of Patent: Oct. 6, 2009

(54) MAGNETIC HEAD WITH LAMINATED SIDE SHIELDS

(75) Inventors: Masahiko Hatatani, Kanagawa (JP); Chiseki Haginoya, Tokyo (JP); Kenichi Meguro, Kanagawa (JP); Kazuhiro Nakamoto, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 712 days.

(21) Appl. No.: 10/977,129

(22) Filed: Oct. 29, 2004

(65) Prior Publication Data
US 2005/0157431 A1   Jul. 21, 2005

(30) Foreign Application Priority Data
Jan. 19, 2004   (JP) .............................. 2004-010796

(51) Int. Cl.
*G11B 5/33* (2006.01)
(52) U.S. Cl. ............. 360/319; 360/123.12; 360/123.37; 360/123.58
(58) Field of Classification Search ............ 360/123.12, 360/123.37, 123.58, 319, 324.12
See application file for complete search history.

(56) References Cited

U.S. PATENT DOCUMENTS

| 6,023,395 A | 2/2000 | Dill et al. | |
| 6,114,719 A * | 9/2000 | Dill et al. | 257/295 |
| 6,456,467 B1 * | 9/2002 | Mao et al. | 360/319 |
| 6,778,363 B2 * | 8/2004 | Meguro et al. | 360/324.11 |
| 6,967,823 B2 * | 11/2005 | Nakamoto et al. | 360/319 |
| 2003/0174446 A1 * | 9/2003 | Hasegawa | 360/319 |
| 2003/0189802 A1 * | 10/2003 | Morinaga et al. | 360/324.12 |
| 2003/0202295 A1 * | 10/2003 | Wang et al. | 360/324.12 |
| 2003/0227725 A1 * | 12/2003 | Macken et al. | 360/324.12 |
| 2004/0100737 A1 * | 5/2004 | Nakamoto et al. | 360/319 |

FOREIGN PATENT DOCUMENTS

| JP | 03-125311 A | 5/1991 |
| JP | 11-259824 A | 9/1999 |

* cited by examiner

Primary Examiner—Andrea L Wellington
Assistant Examiner—Carlos E Garcia
(74) *Attorney, Agent, or Firm*—Townsend and Townsend and Crew LLP; Rambod Nader

(57) ABSTRACT

Embodiments of the invention provide a magnetic recording and read head which reduces the spread read width in a narrow track having a width of 100 nm or less and shows stable read operation. In one embodiment, a side magnetic shield has a multi-layered structure including non-magnetic separate layers and soft magnetic layers, and the soft magnetic layers are magnetized in opposite directions to reduce a magnetic field induced by the side magnetic shield.

19 Claims, 8 Drawing Sheets

MAGNETIC HEAD WITH LAMINATED SIDE SHIELDS

CROSS-REFERENCES TO RELATED APPLICATIONS

This application claims priority from Japanese Patent Application No. 2004-010796, filed Jan. 19, 2004, the entire disclosure of which is incorporated herein by reference.

BACKGROUND OF THE INVENTION

The present invention relates to a magnetic head, and a magnetic recording and playback drive comprising the same.

A magnetic head for use in a magnetic recording and playback drive has a magnetic recording head and a magnetic read head (magnetic read element) which generally comprises a pair of upper and lower magnetic shields, a magnetoresistive film interposed between the shields and a pair of electric leads electrically connected to the magnetoresistive film. In the case of a magnetic recording and playback drive having an areal recording density of more than 100 G bits per $inch^2$, a high sensitivity read element such as a giant magnetoresistive film (GMR film) or tunneling magnetoresistive film (TMR film) is used as the magnetoresistive film. These magnetoresistive films have a ferromagnetic free layer, an intermediate layer, and a ferromagnetic pinned layer; the magnetization of the ferromagnetic free layer turns according to a change in a leakage magnetic field from a magnetic recording medium in which information is recorded. Meanwhile, the direction of the magnetic moment of the ferromagnetic pinned layer is substantially fixed. When a sensing current is applied to these magnetoresistive films, the voltage of the element changes according to the angle between the magnetization of the ferromagnetic free layer and the magnetization of the ferromagnetic pinned layer, and is observed as a read waveform. A conductor is used as the intermediate layer of the GMR film whereas a barrier layer made of an oxidized material is used as the intermediate layer of the TMR film. Although the TMR film has higher element resistance than the GMR film, it has a very large read amplitude which is considered as advantageous in increasing the recording density of a magnetic recording and playback drive.

In the case of the GMR film, a sensing current is applied in the track width direction within the film plane. This type of element is generally called "CIP (current in the plane)." In the CIP element, an insulator is interposed between the upper and lower magnetic shields and the electric leads or GMR film to ensure read output. However, when the interval between the upper and lower magnetic shields is narrowed to increase the recording density of a future magnetic recording and playback drive, the above insulator becomes thin and insulation between the electric leads and the upper and lower magnetic shields deteriorates. As a result, read output greatly decreases and noise increases, thereby significantly reducing the yield of the magnetic head. As a solution to these problems, CPP (current perpendicular to the plane) in which a sensing current is applied perpendicular to the film plane is attracting attention. Since a pair of electric leads can serve as upper and lower magnetic shields in a CIP element, it is not necessary to take insulation between them into account. It is reported that the magnetoresistive ratio of the CPP-GMR film can be made higher than that of a CIP-GMR film. Meanwhile, a TMR element must be of a CPP type because it exhibits a magnetoresistive effect theoretically and a pair of electric leads can serve as upper and lower shields. The CPP-GMR film and the TMR film are thus considered as the most promising for the next-generation high-sensitivity magnetic recording head.

The magnetic read head has a domain control layer to provide a mono-domain structure to the ferromagnetic free layer. This is aimed to maintain the mono-domain structure and prevent the malfunctioning of the recording and playback drive even when the magnetic domain of the ferromagnetic free layer is magnetically influenced by the write head or the upper and lower magnetic shields. As the domain control structure is generally used a structure in which a pair of permanent magnets are arranged at both ends in the track width direction of the magnetoresistive film (JP-A 125311/1991). In this structure, the magnetic domain of the ferromagnetic free layer maintains the mono-domain structure by a magnetic field generated by the permanent magnets. For the TMR film and the CPP-GMR film, a structure that the domain control layer is formed on the ferromagnetic free layer is proposed. As the domain control layer, there is known a multi-layered film consisting of a permanent magnet (JP-A 259824/1999) or antiferromagnetic film and a ferromagnetic film.

To increase the density of a magnetic recording and playback drive, the width of each recording bit must be reduced. To attain this, (1) the interval between the upper and lower magnetic shields of the magnetic read head and the width of the read track must be reduced. At the same time, (2) the magnetic spacing which is the distance between the magnetoresistive film and the surface of the recording medium must be reduced. This is because the media fields from the recording bits are overlapped with one another when the magnetic spacing is large, thereby making it difficult to read recorded information accurately. To realize (1), the interval between electric leads and the width in the track width direction of the magnetoresistive film are reduced. To realize (2), the flying height of the magnetic head is reduced and the protective film of the recording medium is reduced in thickness.

BRIEF SUMMARY OF THE INVENTION

As described above, to increase the recording density of the magnetic recording and playback drive, the element size of the magnetic head has been made very small. However, it is known that when the size in the track width direction of the magnetoresistive film is smaller than 100 nm, the magnetic track width does not become smaller in proportion to the track width. The term "magnetic track width" is defined as follows. The off-track characteristics of the read head, that is, the distribution of read sensitivity is measured using a signal from a smaller recording track than the track width of the magnetoresistive film of the magnetic head. The width of a position corresponding to 10% of the maximum output of this distribution of read sensitivity is taken as "magnetic track width." Further, the difference between the magnetic track width and the track width of the magnetoresistive film is called "spread read width." Then it has been found that a head having a track width of the magnetoresistive film of 100 nm has a spread read width of about 50 nm, that is, about 50% of the width in the track width direction of the magnetoresistive film. Thus, when the spread read width is large, an extremely small element is needed and it is extremely difficult to fabricate such a small element with the current state of art. To reduce the spread read width, there is proposed a magnetic head comprising a side magnetic shield at both ends in the track width direction of the magnetoresistive film.

The side magnetic shield is composed of a soft magnetic film and has a level difference near the magnetoresistive film. Therefore, a complex magnetic domain is formed in the vicinity of the track end portion of the side magnetic shield. Meanwhile, magnetic charges are generated in the track end portion of the side magnetic shield and induce a magnetic field at the position of the magnetoresistive film. When a signal field from the medium or a leakage magnetic field from the write head enters the side magnetic shield, the magnetic domain of the side magnetic shield moves irreversibly, whereby the distribution of the above magnetic charges changes irregularly along the passage of time. As a result, the magnetic charges generate an irregular magnetic field at the position of the magnetoresistive film along the passage of time, and this magnetic field increases Barkhausen noise and changes the read output. When this unstable read head having a low SN ratio is incorporated in a magnetic recording and playback drive, it is easily projected that the drive will not operate properly.

In order to eliminate the influence of the magnetic field from the side magnetic shield, it is conceivable that the interval in the track width direction between the magnetoresistive film and the side magnetic shield should be made large. However, when the interval is made large, the effect of reducing the spread read width becomes small. For example, according to calculation by the inventors of the present invention, in order to reduce the magnetic field from the side magnetic shield to about 8 kA/m, i.e., about half the magnetic field of a media signal in a head having a width in the track width direction of the magnetoresistive film of 100 nm, the interval in the track width direction between the magnetoresistive film and the side magnetic shield film must be increased to about 20 nm. In this case, the spread read width reaches 34 nm. Meanwhile, when the interval in the track width direction between the magnetoresistive film and the side magnetic shield film is 10 nm, the spread read width can be reduced to about 20 nm but the value of the magnetic field from the side magnetic shield reaches 34.4 kA/m. It is considered from the results of these calculations that the interval in the track width direction between the magnetoresistive film and the side magnetic shield film must be made as large as 20 nm or more in order to obtain stable read operation. In this case, the spread read width reaches 35% of the track width of the magnetoresistive film.

Thus, in the conventional side magnetic shield, the stable read operation and the effect of reducing the spread read width conflict with each other. Considering from the fact that the proportion of the spread read width to the track width of the magnetoresistive film increases as the track width becomes narrower, it is clear that it is difficult to realize a future narrow track read head.

It is a feature of the present invention to provide a narrow track read head having side magnetic shields, which realizes the effect of fully reducing the spread read width and stable read operation at the same time as well as a magnetic recording and playback drive having an area recording density of more than 100 Gb/inch$^2$.

The above feature of the present invention is attained by preparing a side magnetic shield having a multi-layer structure that includes separate layers and soft magnetic layers which are arranged alternately, having the soft magnetic layers magnetized in opposite directions, and setting the number of side magnetic shield layers and the interval between the side magnetic shield and the magnetoresistive film to optimum values to minimize the magnetic influence upon the magnetoresistive film of the side magnetic shield.

According to an aspect of the present invention, the magnetic head comprises an upper magnetic shield, a lower magnetic shield, a magnetoresistive film interposed between the upper magnetic shield and the lower magnetic shield, and electric leads for applying a current in the thickness direction of the magnetoresistive film. The magnetoresistive film has a first ferromagnetic layer whose magnetization direction is changed by an external magnetic field, a non-magnetic layer, a second ferromagnetic layer whose magnetization direction is fixed, and a pair of side magnetic shields, each including a plurality of soft magnetic layers and a plurality of separate layers which are arranged alternately, are formed on both sides in the track width direction of the magnetoresistive film. The separate layers contain Ta, Cu, Ru, Cr, Ir or Rh, and two soft magnetic layers above and below each separate layer are magnetized in opposite directions. Each side magnetic shield preferably has 3 or more soft magnetic layers.

Since the side magnetic shield has a multi-layer structure including soft magnetic layers which are magnetized in opposite directions and separate layers, magnetic charges having opposite signs are generated alternately in the track end portion of the side magnetic shield, thereby greatly reducing a magnetic field induced at the position of the magnetoresistive film, preventing Barkhausen noise caused by the irreversible movement of the magnetic domain of the side magnetic shield, and suppressing a change in read output. As a result, even when the read track (width) of a magnetic read element constituting the magnetic head is narrow, the effective read track width can be minimized and side reading can be prevented.

DETAILED DESCRIPTION OF THE INVENTION

Since the side magnetic shield is arranged at both ends in the track width direction of the magnetoresistive film in embodiments of the present invention, a TMR film or CPP-GMR film is used as the magnetoresistive film, and further a domain control layer is formed on the magnetoresistive film. In this structure, a permanent magnet for domain control does not need to be arranged at both ends in the track width direction of the magnetoresistive film unlike the conventional head. Embodiments of the magnetic head and the magnetic recording and playback drive to which the present invention is applied will be described hereinbelow. For easy understanding, the same functional parts are given the same reference symbols in the following diagrams.

EXAMPLE 1

Figure 1:
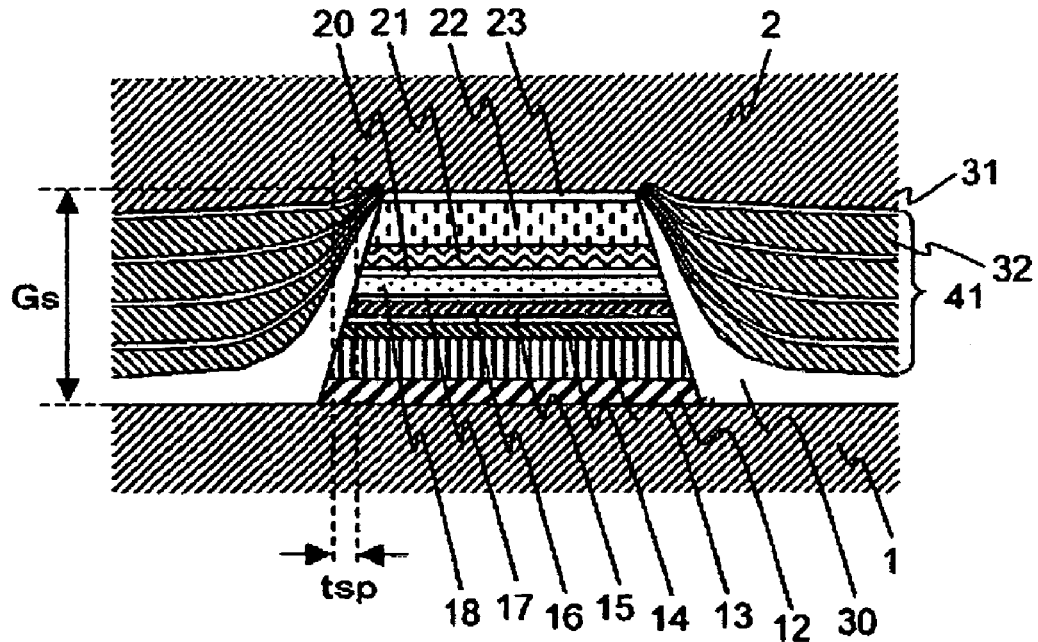
FIG. 1 shows an example of a magnified ABS view of the magnetic head in accordance with the present invention.

FIG. 1 is a diagram of one example of the magnetic head of the present invention. FIG. 1 is an enlarged ABS view of a read head. A 3 μm-thick lower magnetic shield 1 made of NiFe was formed on a substrate through base alumina. The lower magnetic shield 1 also serves as part of a pair of electric leads for electrically connecting a magnetoresistive film. A TMR film was formed on the lower magnetic shield. The TMR film consisted of an underlayer 12 made of 1 nm-thick NiFe and 3.5 nm-thick NiCrFe, a 15 nm-thick MnPt antiferromagnetic layer 13, a 2 nm-thick NiFe first ferromagnetic pinned layer 14, a 1 nm-thick Ru non-magnetic separate layer 15, a 3 nm-thick NiFe second ferromagnetic pinned layer 16, a 0.6 nm-thick alumina barrier layer 17 and a 4 nm-thick NiFe ferromagnetic free layer 18 in the mentioned order from the substrate side. In this example, the TMR film was used as the magnetoresistive film but a CPP-GMR film can be used in place of the TMR film. The ferromagnetic layer 13 may be omitted according to the circumstances.

A domain control layer was formed on the TMR element to provide a mono-domain structure to the ferromagnetic free layer 18. The domain control layer was composed of a 2 nm-thick CoFe longitudinal biasing layer 21 and a 12 nm-thick PtMn antiferromagnetic layer 22 and formed on a 2 nm-thick Ta non-magnetic separate layer 20. The non-magnetic separate layer 20 may be a multi-layered film made of 1 nm-thick Cu and 1 nm-thick Ru. The antiferromagnetic layer 22 may be made of IrMn. The domain control layer may be composed of a 2 nm-thick CoCrPt hard magnetic layer formed on a 3 nm-thick non-magnetic separate layer. A capping layer 23 made of 4 nm-thick Ta and 6 nm-thick Ru was formed on the antiferromagnetic layer 22.

Thin films such as the above TMR film and CPP-GMR film were manufactured by depositing the following materials on a 1 nm-thick ceramic substrate in an Ar atmosphere at a pressure of 1 to 6 mTorr by a high-frequency magnetron sputtering device one by one. Ta, Ni-20 at % Fe alloy, Cu, Co, MnPt, Ru, alumina and NiMn targets were used as sputtering targets. 1 $cm^2$ Fe and Ni chips were arranged on the Co target to control composition. The multi-layered film was formed by applying high frequency electric power to each cathode where each target was arranged to generate plasma in the device and opening and closing shutters arranged in each cathode one by one to form each layer. At the time of forming a film, a permanent magnet was used to apply a magnetic field of 640 A/m to a substrate in parallel to the substrate in order to provide magnetic uniaxial anisotropy. The formed film was annealed under vacuum in a magnetic field at 270° C. for 3 hours for the phase transformation of the MnPt antiferromagnetic film to measure its magnetic resistance at room temperature. After annealing, a large magnetic field was applied to the hard magnetic film at room temperature.

The magnetoresistive film was patterned to ensure that the width in the track width direction of the barrier layer 17 became a desired value. In this example, it was 90 nm. Patterning was carried out by placing a photoresist having a predetermined width on the magnetoresistive film and removing unnecessary portions by etching while using this photoresist as a mask. Before this mask was removed, an insulator 30 made of alumina or silicon oxide was formed. The thickness of the flat portion of the insulator 30 was 25 nm. Further, a multi-layered side magnetic shield 41 consisting of 2 nm-thick Ta non-magnetic separate layers 31 and soft magnetic shield layers 32 was formed on the insulator 30. In this example, the number of the soft magnetic shield layers 32 was 4. However, a desired number of layers may be formed and the number of layers is preferably 3 or more. Each of the non-magnetic separate layers 31 may be a multi-layered film made of 1 nm-thick Cu and 1 nm-thick Ru. The soft magnetic layers and separate layers converge along a line formed by an upper corner of the magnetoresistive film and the upper magnetic shield.

After the above mask was removed, a 2 μm-thick NiFe upper magnetic shield 2 was formed on the magnetoresistive film patterned as described above. The upper magnetic shield 2 also serves as part of a pair of electric leads for electrically connecting the magnetoresistive film.

The interval Gs between the upper magnetic shield 2 and the lower magnetic shield 1 in a portion where the magnetoresistive film is arranged is 55 nm. Meanwhile, the interval tsp in the track width direction of the ferromagnetic free layer 18 and the side magnetic shield 41 is 10 nm. To control the interval Gs between the upper and lower magnetic shields, the thicknesses of the underlayer 12, antiferromagnetic layer 13, antiferromagnetic layer 22 and capping layer 23 may be changed.

The recording and read characteristics of the magnetic head having multi-layered side magnetic shields of this example was evaluated by setting the magnetic spacing between the ABS(Air bearing surface) of the head and the magnetic recording medium at 15 nm.

Although the width in the track width direction of the TMR film was narrow at 90 nm, a read output higher than 2 mV at a detection voltage of 150 mV was obtained. Thereafter, an extremely narrow track was formed on the magnetic recording medium to measure the off-track characteristics (sensitivity distribution) of the read element. When the width of the sensitivity distribution at a position corresponding to 10% of the maximum output was defined as "magnetic track width," it was about 114 nm. Therefore, the spread read width in this example was about 24 nm. A change in read output was measured by carrying out recording and read operations repeatedly to confirm the stability of the read operation. A change in read output after 1,000 times of recording and read operations was good at 8.5%. A change in read output is defined as a value obtained by dividing the difference between the maximum value and the minimum value of read output by an average value.

For comparison, a head having the same magnetoresistive film and single-layer side magnetic shields of the same element size as the above magnetic head was fabricated to evaluate its recording and read characteristics. As a result, the obtained read output and spread read width values were almost the same at 2 mV or more and about 26 nm, respectively. However, the change rate of read output was large at 15.7%. Therefore, in this example, a magnetic head having the great effect of reducing the spread read width and showing stable read operation was obtained by providing a multilayered structure to the side magnetic shields.

EXAMPLE 2

Figure 2:
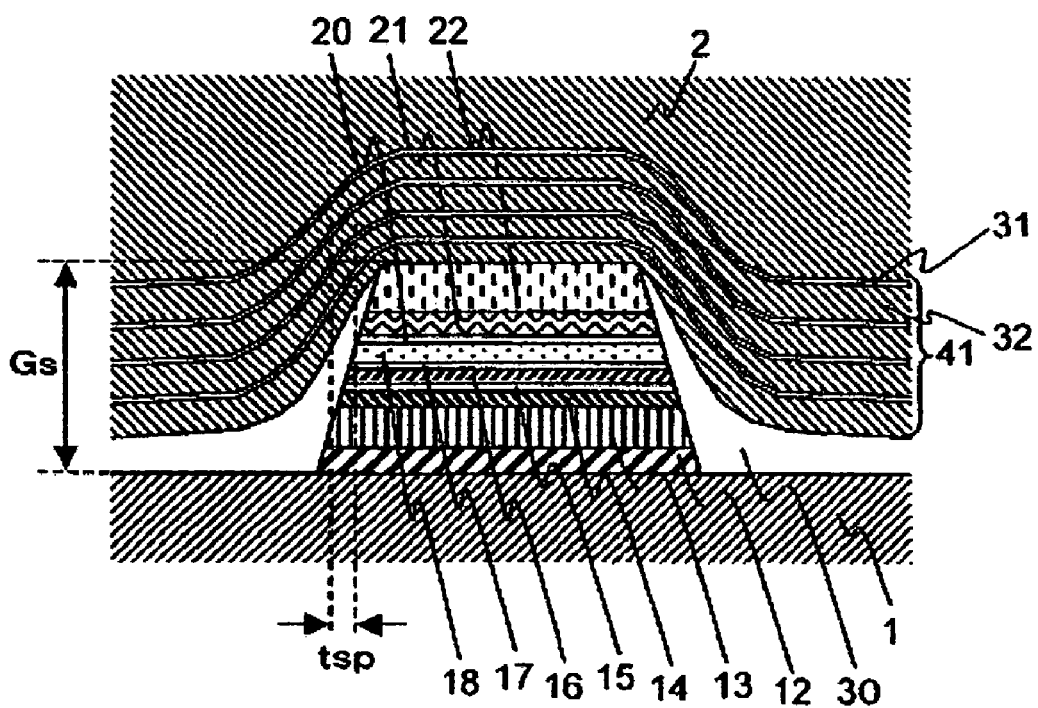
FIG. 2 shows another example of a magnified ABS view of the magnetic head in accordance with the present invention.

The magnetic head according to another embodiment of the present invention may have a structure in which part of the side magnetic shield is integrated with the upper magnetic shield. An example of this magnetic head is shown in FIG. 2. The magnetic head of this example has already been outlined in Example 1.

A 3 μm-thick NiFe lower magnetic shield 1 was formed on a substrate through base alumina. The lower magnetic shield 1 also serves as part of a pair of electric leads for electrically connecting a magnetoresistive film. A TMR film was formed on the lower magnetic shield. The detailed constitution of the TMR film is the same as that of Example 1. A CPP-GMR film may be used in place of the TMR film. A domain control layer was formed on the TMR element to provide a mono-domain structure to the ferromagnetic free layer 18. The domain control layer was composed of a 2 nm-thick CoFe longitudinal biasing layer 21 and a 12 nm-thick PtMn antiferromagnetic layer 22 and formed on a 2 nm-thick Ta non-magnetic separate layer 20. The non-magnetic separate layer 20 may be a multi-layered film made of 1 nm-thick Cu and 1 nm-thick Ru. The domain control layer may be composed of a 2 nm-thick CoCrPt hard magnetic material formed on a 2 nm-thick Ta non-magnetic separate layer. A capping layer 23 made of 4 nm-thick Ta and 6 nm-thick Ru was formed on the antiferromagnetic layer 22.

The magnetoresistive film was patterned to ensure that the width in the track width direction of the barrier layer 17 became a desired value, e.g., 90 nm in this example. Patterning was carried out by placing a photoresist having a predetermined width on the magnetoresistive film and removing unnecessary portions by etching using this photoresist as a mask. Before this mask was removed, an insulator 30 made of alumina or silicon oxide was formed. The thickness of the flat portion of the insulator 30 was 25 nm. After the above mask was removed, a multi-layered side magnetic shield 41 composed of 2 nm-thick Ta non-magnetic separate layers 31 and soft magnetic shield layers 32 was formed on the insulator 30. In this example, the number of the soft magnetic shield layers was 4 but may be any desired value (3 or more). Each of the non-magnetic separate layers 31 may be a multi-layered film made of 1 nm-thick Cu and 1 nm-thick Ru.

Further, a 2 μm-thick NiFe upper magnetic shield 2 was formed on the side magnetic shield. The upper magnetic shield 2 also serves as part of a pair of electric leads for electrically connecting a magnetoresistive film. The interval Gs between the top of the antiferromagnetic layer 22 and the lower magnetic shield 1 in a portion where the magnetoresistive film is arranged is 55 nm. The width tsp in the track width direction between the ferromagnetic free layer 18 and the side magnetic shield 41 is 10 nm.

When the mask is removed before the side magnetic shield is formed, an advantage in the production process that the resist hardly remains is obtained.

EXAMPLE 3

Figure 3:
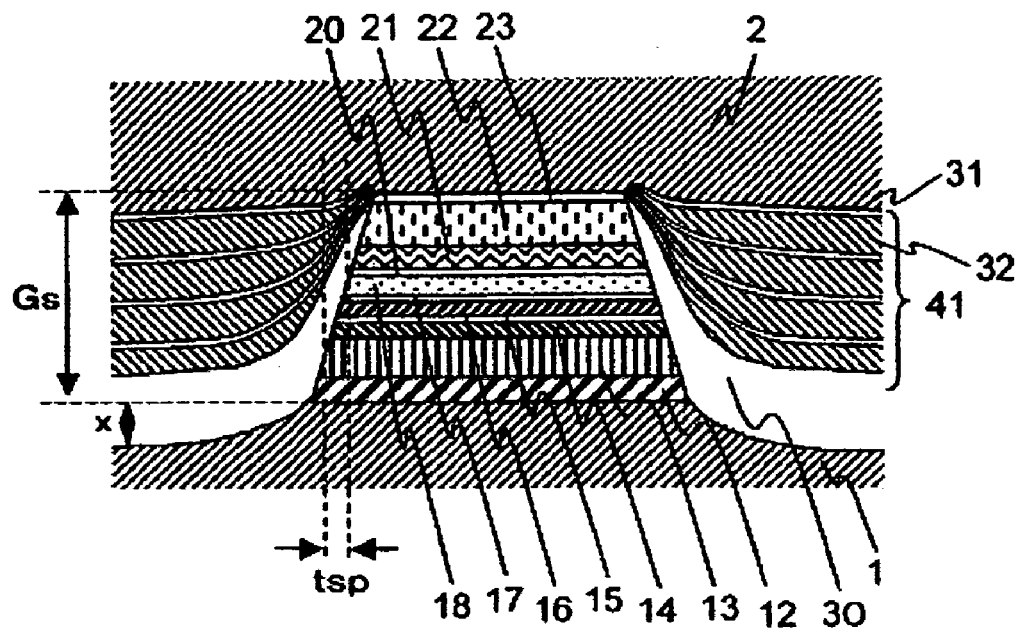
FIG. 3 shows another example of a magnified ABS view of the magnetic head in accordance with the present invention.

The magnetic head according to another embodiment of the present invention may have a structure that a lower shied is dug down. An example of this magnetic head is shown in FIG. 3. The magnetic head of this example has already been outlined in Example 1.

A 3 μm-thick NiFe lower magnetic shield 1 was formed on a substrate through base alumina. The lower magnetic shield 1 also serves as part of a pair of electric leads for electrically connecting a magnetoresistive film. A TMR film was formed on the lower magnetic shield. The detailed constitution of the TMR film is the same as that of Example 1. A CPP-GMR film may be used in place of the TMR film. A domain control layer was formed on the TMR element to provide a mono-domain structure to the ferromagnetic free layer 18. The domain control layer was composed of a 2 nm-thick CoFe longitudinal biasing layer 21 and a 12 nm-thick PtMn antiferromagnetic layer 22 and formed on a 2 nm-thick Ta non-magnetic separate layer 20. The non-magnetic separate layer 20 may be a multi-layered film made of 1 nm-thick Cu and 1 nm-thick Ru. The domain control layer may be composed of a 2 nm-thick CoCrPt hard magnetic material formed on a 2 nm-thick Ta non-magnetic separate layer. A capping layer 23 made of 4 nm-thick Ta and 6 nm-thick Ru was formed on the antiferromagnetic layer 22.

The magnetoresistive film was patterned to ensure that the width in the track width direction of the barrier layer 17 became a desired value, e.g., 90 nm in this example. Patterning was carried out by placing a photoresist having a predetermined width on the magnetoresistive film and removing unnecessary portions by etching using this photoresist as a mask. Part of the top surface of the lower magnetic shield 1 was dug down a suitable thickness x by etching at the same time. In this example, the amount x of digging was 20 nm. Before this mask was removed, an insulator 30 made of alumina or silicon oxide was formed. The thickness of the flat portion of the insulator 30 was 25 nm. Further, a multi-layered side magnetic shield 41 consisting of 2 nm-thick Ta non-magnetic separate layers 31 and soft magnetic shield layers 32 was formed on the insulator 30. In this example, the number of soft magnetic shield layers 32 was 4 but may be any desired value. Each of the non-magnetic separate layer 31 may be a multi-layered film made of 1 nm-thick Cu and 1 nm-thick Ru.

After the above mask was removed, a 2 μm-thick NiFe upper magnetic shield 2 was formed on the magnetoresistive film patterned as described above. The upper magnetic shield 2 also serves as part of a pair of electric leads for electrically connecting a magnetoresistive film. The interval Gs between the upper magnetic shield 2 and the lower magnetic shield 1 in a portion where the magnetoresistive film is arranged is 55 nm. The width tsp in the track width direction between the ferromagnetic free layer 18 and the side magnetic shield 41 is 10 nm.

In this example, since the thickness of the insulator 30 becomes larger than that of a magnetic head in which the amount x of digging is zero, the performance of the insulator between the upper magnetic shield 2 and the lower magnetic shield 1 becomes high. Therefore, there is obtained an advantage that the reliability of the head improves. On the other hand, a level difference is produced in the lower magnetic shield 1, whereby the domain structure becomes slightly unstable and the production process becomes slightly complicated. Therefore, the amount of digging may be 80 nm at maximum and should be determined in consideration of the reliability and production cost of the head.

EXAMPLE 4

Figure 4:
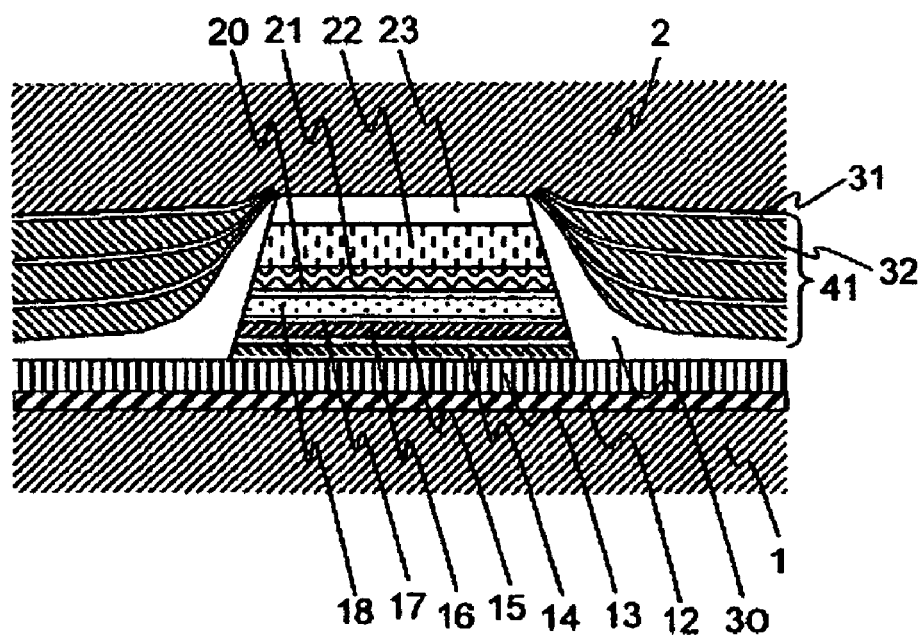
FIG. 4 shows another example of a magnified ABS view of the magnetic head in accordance with the present invention.

The magnetic head according to another embodiment of the present invention may have a structure that the patterning of the magnetoresistive film is stopped before the antiferromagnetic layer 13 constituting the TMR film. An example of this case is shown in FIG. 4. The magnetic head of this example has already been outlined in Example 1.

A 3 μm-thick NiFe lower magnetic shield 1 was formed on a substrate through base alumina. The lower magnetic shield 1 also serves as part of a pair of electric leads for electrically connecting a magnetoresistive film. A TMR film was formed on the lower magnetic shield. The TMR film was composed of an underlayer 12 made of 1 nm-thick NiFe and 3.5 nm-thick NiCrFe, a 20 nm-thick MnPt antiferromagnetic layer 13, a 2 nm-thick NiFe first ferromagnetic pinned layer 14, a 0.8 nm-thick Ru non-magnetic separate layer 15, a 3 nm-thick NiFe second ferromagnetic pinned layer 16, a 0.6 nm-thick alumina barrier layer 17 and a 4 nm-thick NiFe ferromagnetic free layer 18 in the mentioned order from the substrate side. A CPP-GMR film may be used in place of the TMR film. A domain control layer was formed on the TMR element to provide a mono-domain structure to the ferromagnetic free layer 18. The domain control layer was composed of a 2 nm-thick CoFe longitudinal biasing layer 21 and a 15 nm-thick PtMn antiferromagnetic layer 22 and formed on a 2 nm-thick Ta non-magnetic separate layer 20. The non-magnetic separate layer 20 may be a multi-layered film made of 1 nm-thick Cu and 1 nm-thick Ru. The domain control layer may be composed of a 2 nm-thick CoCrPt hard magnetic material formed on a 2 nm-thick Ta non-magnetic separate layer. A capping layer 23 made of 4 nm-thick Ta and 6 nm-thick Ru was formed on the antiferromagnetic layer 22.

The magnetoresistive film was patterned to ensure that the width in the track width direction of the barrier layer 17 became a desired value, e.g., 90 nm in this example. Patterning was carried out by placing a photoresist having a predetermined width on the above magnetoresistive film and removing unnecessary portions by etching using this photoresist as a mask while monitoring not to remove the antiferromagnetic layer 21. Before this mask was removed, an insulator 30 made of alumina or silicon oxide was formed. The thickness of the flat portion of the insulator 30 was 20 nm. Further, a multi-layered side magnetic shield 41 composed of 2 nm-thick Ta non-magnetic separate layers 31 and soft magnetic shield layers 32 was formed on the insulator 30. In this example, the number of the soft magnetic shield layers was 4 but may be any desired value. Each of the non-magnetic separate layers 31 may be a multi-layered film made of 1 nm-thick Cu and 1 nm-thick Ru.

After the above mask was removed, a 2 μm-thick NiFe upper magnetic shield 2 was formed on the magnetoresistive film patterned as described above. The upper magnetic shield 2 also serves as part of a pair of electric leads for electrically connecting the magnetoresistive film. The interval Gs between the upper magnetic shield 2 and the lower magnetic shield 1 in a portion where the magnetoresistive film is arranged is 55 nm. The width tsp in the track width direction between the ferromagnetic free layer 18 and the side magnetic shield 41 is 10 nm.

In this example, the thickness of the antiferromagnetic layer 13 is 15 nm and may be increased to about 20 nm. When the antiferromagnetic layer 13 is made thick, the thermal stability of the antiferromagnetic layer improves. To adjust the interval Gs between the upper magnetic shield 2 and the lower magnetic shield 1, the thicknesses of the underlayer 12, the antiferromagnetic layer 22 and the capping layer 23 may be changed. When patterning is stopped before the antiferromagnetic layer 13 as shown in FIG. 4, the resistances of the antiferromagnetic layer 13 and the underlayer 12 become lower than that of the head shown in FIG. 1. Therefore, the resistance of the read head lowers and noise decreases. As the CPP-GMR film has low element resistance and large contribution to resistance from the antiferromagnetic layer 13, the effect of reducing the resistance of the head is large. Since the element size is becoming smaller and the element resistance is becoming higher, it is considered that the structure of this example is becoming more and more important.

Figure 5:
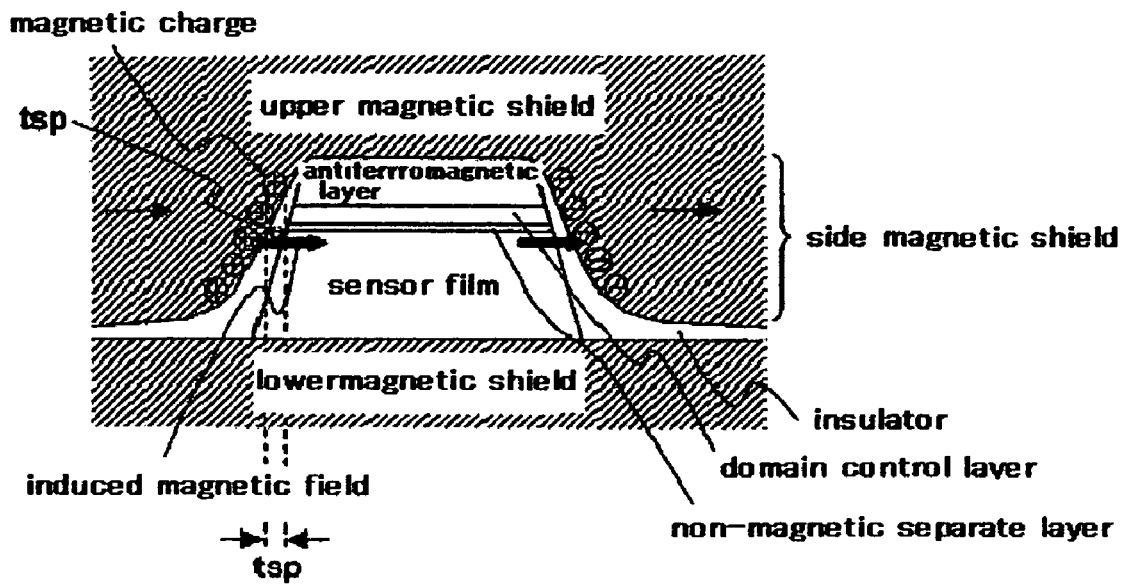
FIG. 5 shows a conceptual ABS view of the magnetic head with a single-layer side magnetic shield.

A description is subsequently given of the results of studies on the number of layers of the side magnetic shield. FIG. 5 is a conceptual diagram of a magnetic head with single-layer side magnetic shields and FIG. 6 is a conceptual diagram of a magnetic head with multi-layered side magnetic shields.

In the magnetic head with single-layer side magnetic shields shown in FIG. 5, magnetic charges having the same sign are generated at the track end of each side magnetic shield and induce a magnetic field at the position of a sensor film. Meanwhile, since the side magnetic shield has a level difference as seen from FIG. 5, it has many magnetic domains. These magnetic domains are influenced by the magnetic field of the medium and a leakage magnetic field from the write head to move irreversibly. Therefore, as the distribution of magnetic charges induced at the track end changes along the passage of time, the induced magnetic field changes along the passage of time as well, which induces Barkhausen noise and causes unstable read operation. Therefore, it is considered that the read operation is stabilized by reducing the induced magnetic field.

Figure 6:
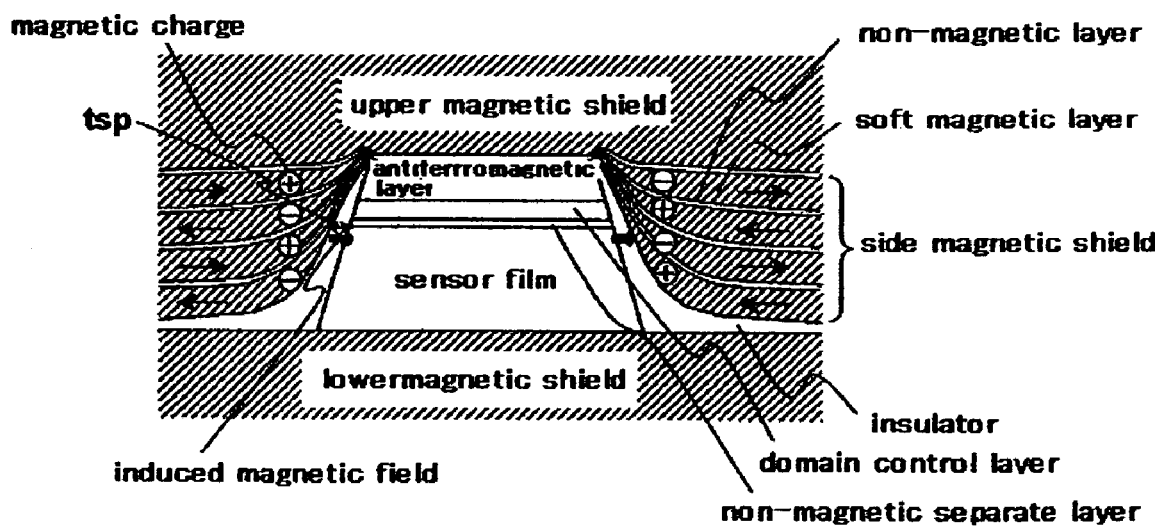
FIG. 6 shows a conceptual ABS view of the head with a multi-layered side magnetic shield.

To realize this, in another embodiment of the present invention as shown in FIG. 6, the side magnetic shield has multiple soft magnetic layers formed on the non-magnetic layers, and the soft magnetic layers are magnetized in opposite directions. When this structure is employed, as shown in FIG. 6, magnetic charges having opposite signs are generated at the track end of the side magnetic shield and magnetic fields induced by these are canceled by each other. Static magnetic coupling or ferromagnetic exchange coupling is utilized to magnetize the soft magnetic layers in opposite directions.

Figure 7:
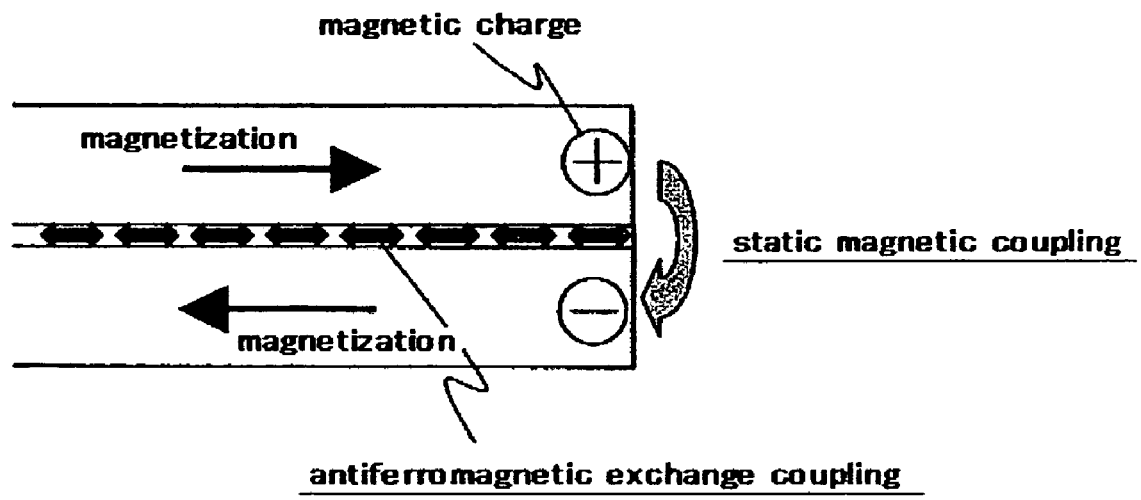
FIG. 7 shows an explanation of the static magnetic coupling and antiferromagnetic exchange coupling between the two soft magnetic layers.

FIG. 7 is a conceptual diagram of coupling between soft magnetic layers separated by non-magnetic layers. As shown in FIG. 7, static magnetic coupling acts on the track ends of the soft magnetic layers and antiferromagnetic exchange coupling acts on the film plane of each soft magnetic layer. Thus, when the side magnetic shield has a plurality of soft magnetic layers which are magnetized in opposite directions, the induced magnetic field at the position of the sensor film can be greatly reduced as compared with a single-layer magnetic shield.

Figure 8:
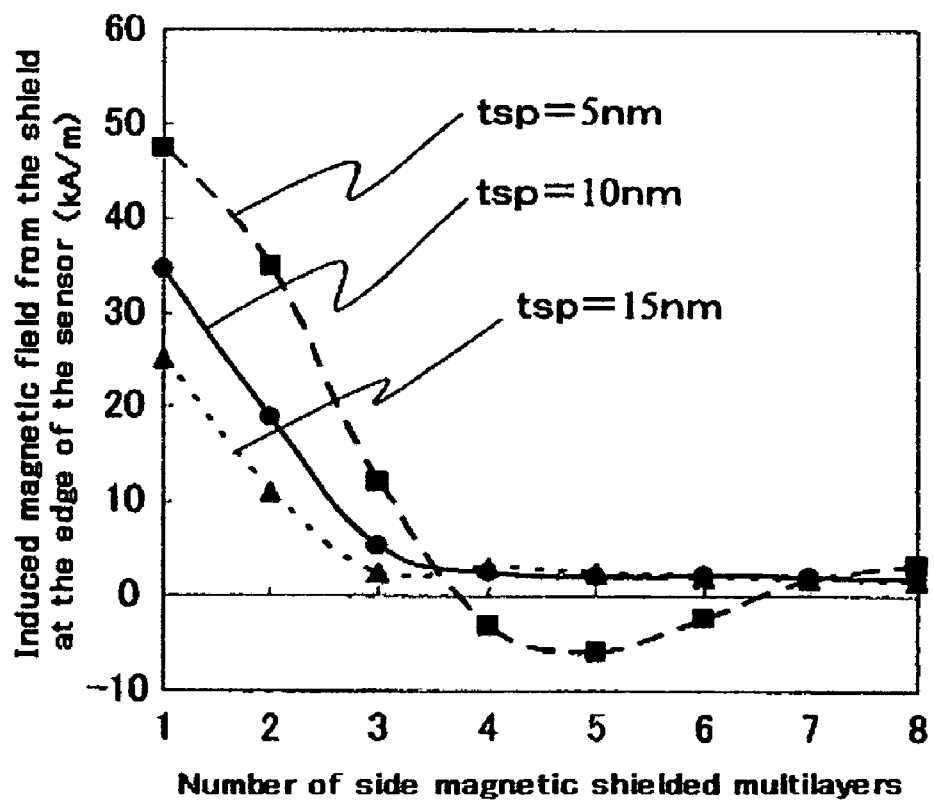
FIG. 8 shows a plot of the relation between the number of the side magnetic shielded multilayers and the induced magnetic field from the side shield of the magnetic head in accordance with an embodiment of the present invention.

To verify this, the results of investigation will be given below based on calculation based on magnetic charge models. FIG. 8 shows the relationship between the number of layers of the side magnetic shield and the induced magnetic field. The interval tsp between the side magnetic shield and the sensor film is changed to 5 nm, 10 nm, and 15 nm. It is understood from FIG. 8 that, in the case of a single-layer magnetic shield (the number of layers is 1), as tsp becomes narrower, the induced magnetic field greatly increases. When tsp is 15 nm or less, the induced magnetic field is 25 kA/m or more which is almost the same as the media signal magnetic field (several tens of kA/m). Therefore, in the case of the single-layer magnetic shield, it is considered that the induced magnetic field has a great influence upon read operation. When the number of layers is 3 or more, regardless of tsp, the induced magnetic field is 10 kA/m or less which is smaller than the media field.

Figure 9:
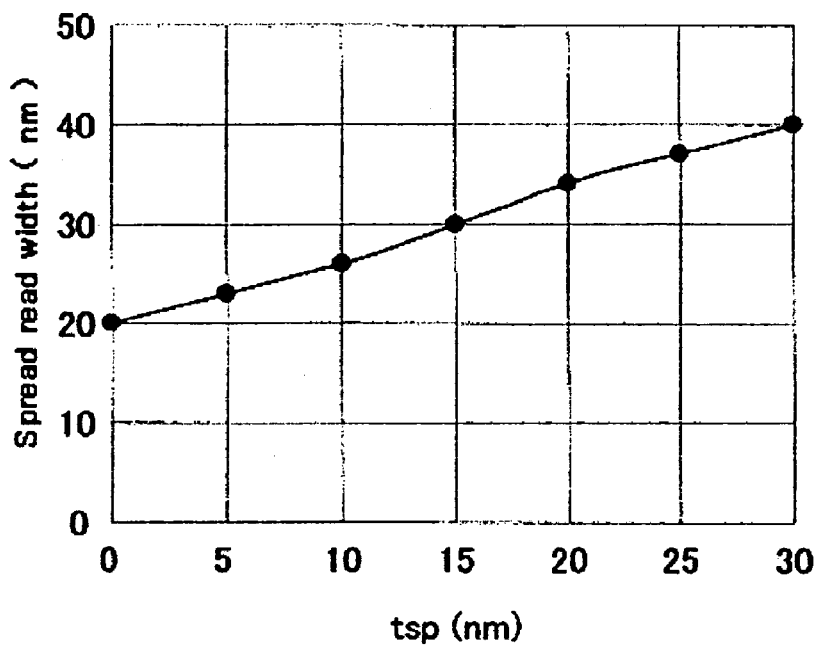
FIG. 9 shows a plot of the relation between the spacing from the side magnetic shield to the MR element and the spread read width of the magnetic head in accordance with another embodiment of the present invention.

FIG. 9 shows the relationship between tsp and the spread read width. In FIG. 9, calculation is made based on the condition that the number of layers is 3. As shown in FIG. 9, when tsp becomes narrower, the spread read width decreases. For example, when tsp is 5 nm, the spread read width is about 30% smaller than that when tsp is 20 nm. A reduction in tsp is effective in reducing the spread read width.

Thus, when the number of layers of the shield is 3 or more, even if tsp is narrow at 5 nm, the induced magnetic field is sufficiently small and stable read operation is obtained. Since tsp can be made much narrower, a greater spread read width reduction effect can be expected.

Figure 10:
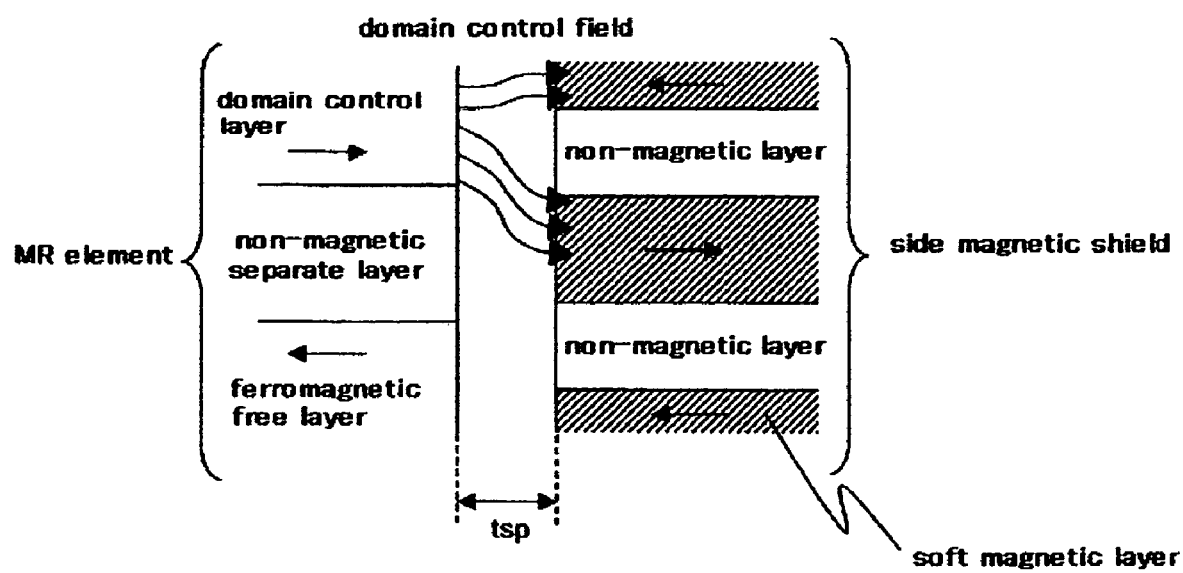
FIG. 10 shows a conceptual magnified view around the region of the side magnetic shield and MR element of the magnetic head in accordance with another embodiment of the present invention.

It is understood from FIG. 8 that when the number of layers is large, even if tsp is 5 nm or less, the induced magnetic field is sufficiently small. To reduce the spread read width, tsp is preferably narrower. However, when tsp is almost the same as the distance (about 2 nm) between the ferromagnetic free layer and the domain control layer, an output change may become a problem. FIG. 10 is a partially enlarged conceptual diagram of the magnetoresistive element and the side magnetic shield. As shown in FIG. 10, when tsp becomes narrow, a magnetic flux from the domain control layer is absorbed into the side magnetic shield, thereby weakening domain control force applied to the ferromagnetic free layer. As a result, the magnetic domain of the ferromagnetic free layer becomes unstable, Barkhausen noise increases, and a output change becomes large. Therefore, a value larger than the distance (about 2 nm) between the ferromagnetic free layer and the domain control layer is desirably selected as tsp. The distance tsp is desirably smaller than the distance between the surface of the magnetic recording medium and the ABS (air bearing surface) of the magnetic read element, that is, magnetic spacing. Since the size in the track width direction of the media magnetic field is almost the same as the magnetic spacing, if tsp is smaller than the magnetic spacing, a side shield effect is rarely obtained.

Figure 11:
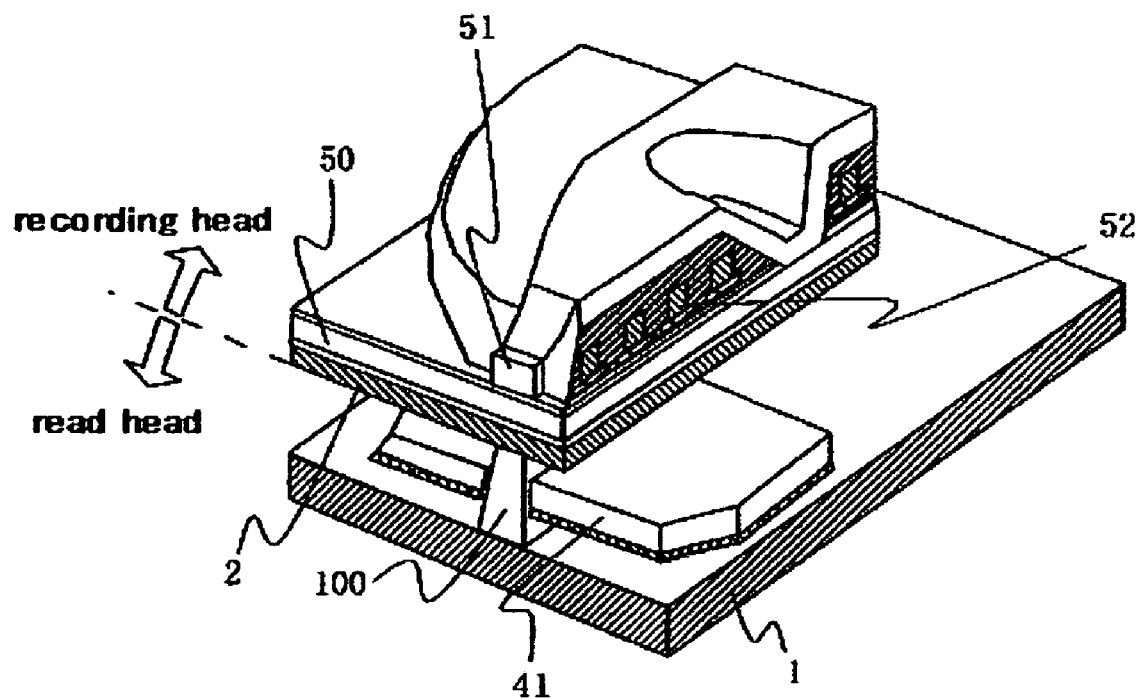
FIG. 11 shows an example of a conceptual diagonally cross sectional view of the magnetic head in accordance with another embodiment of the present invention.

FIG. 11 is a schematic perspective sectional view of an example of the magnetic head of the present invention. Coils 52 for generating a magnetic flux were formed between an upper yoke 51 and a lower yoke 50 and a write current having a desired pattern was applied to the coils to generate a write magnetic field in the recording gap between the upper and lower yokes 51 and 50 so as to write magnetization information having a desired magnetization direction to the magnetic recording medium. The leakage magnetic field was detected with the magnetoresistive film 100 from magnetization information written to the magnetic medium to read the information. Since the write head portion and the read head portion were formed on the same substrate integratedly and existent close to each other as described above, the write magnetic field generated from the write head portion affected the read head portion and changed a read signal waveform and output. As the domain control layers 21 and 22 were formed on the magnetoresistive film as shown in FIG. 1 in this example, even when the write and read operations were repeated 1,000 times, the change width of read output was 10% or less which is sufficiently low for practical use. When the domain control layer was omitted, output became half or twice the reference value. Therefore, it could be confirmed that stable operation was obtained by the effect of the domain control layers 21 and 22.

EXAMPLE 5

The above examples are all magnetic heads for longitudinal recording. This example is a magnetic head for perpendicular recording.

Figure 12:
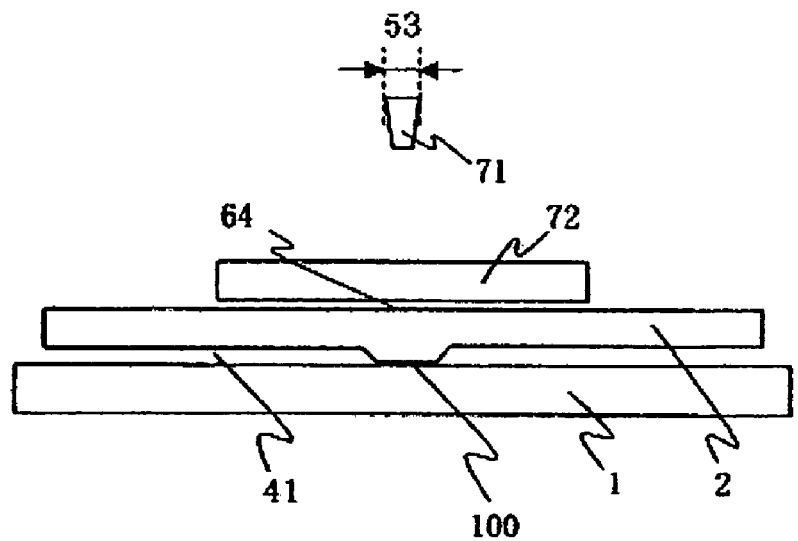
FIG. 12 shows an example of an ABS view of the magnetic head in accordance with another embodiment of the present invention.

FIG. 12 is an ABS view of the magnetic head of this example. A lower shield 1, a magnetoresistive film 100 and an upper shield 2 were formed in the mentioned order from the substrate (not shown) side, a 500 nm-thick alumina non-magnetic separate layer 64 was formed on this read element, and a 2 μm-thick Ni—Fe alloy return pole 72 was formed on the non-magnetic separate layer 64. A multi-layered side magnetic shield composed of separate layers and soft magnetic layers which were arranged alternately was formed on both sides in the track width direction of the magnetoresistive film 100. A 200 nm-thick Fe—Co alloy main pole 71 was formed above the return pole 72. The main pole 71 is shaped like an inverted trapezoid having a larger upper width than its lower width as shown in the enlarged view of the figure, and the upper width 53 was 130 nm. The distance between the main pole 71 and the return pole 72 at ABS was about 5 μm.

Figure 13:
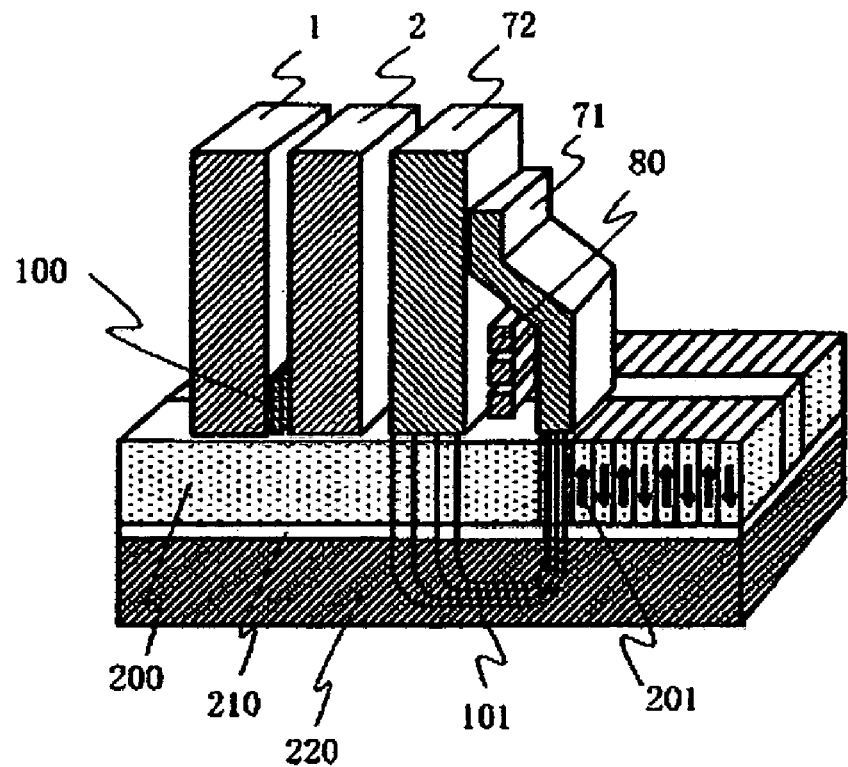
FIG. 13 shows a conceptual diagonally cross sectional view of the magnetic head shown in FIG. 12.

FIG. 13 is a schematic perspective sectional view of the magnetic head of this example. Coils 80 for generating a magnetic flux were formed between the main pole 71 and the return pole 72. By applying a recording current having a desired pattern to these, a recording magnetic field 101 was generated in the magnetic gap between the main pole 71 and the return pole 72 to be applied in a desired pattern to the magnetic recording layer 200 of the magnetic recording medium, thereby writing magnetization information 201 to the magnetic recording layer 200. To use the magnetic field generated in the magnetic head more effectively for perpendicular recording, a 5 nm-thick non-magnetic separate film 210 and a 200 nm-thick soft magnetic underlayer 220 were formed under the magnetic recording layer 200. To read information, the magnetic field leaked from the magnetization information 201 written to the magnetic recording layer 200 is detected by the magnetoresistive film 100. A magnetic recording and playback drive having high recording density can be realized by using this magnetic head.

EXAMPLE 6

Example 5 is a magnetic head having a main pole on the read head side. This example is a magnetic head for perpendicular recording having a return pole on a read head side.

Figure 14:
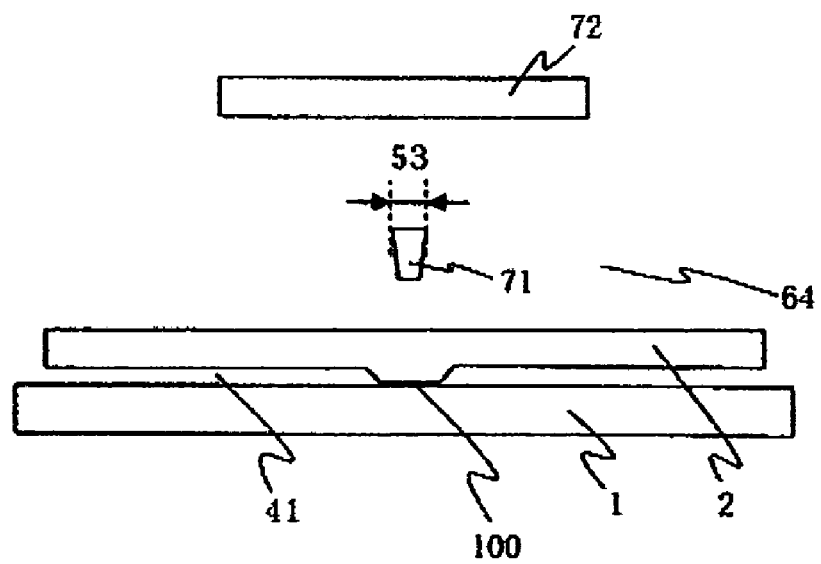
FIG. 14 shows another example of an ABS view of the magnetic head in accordance with another embodiment of the present invention.

FIG. 14 is an ABS view of the magnetic head of this example. A lower shield 1, a magnetoresistive film 100 and an upper shield 2 were formed in the mentioned order from the substrate (not shown) side, and a 200 nm-thick Fe—Co alloy main pole 71 and a 2 μM-thick Ni—Fe alloy return pole 72 were formed on this read element through an alumina non-magnetic separate layer 64. The main pole 71 is shaped like an inverted trapezoid having a larger upper width than its lower width as shown in the enlarged view of the figure, and the upper width 53 was 130 nm. The distance between the main pole 71 and the return pole 72 at ABS was about 5 μm. The magnetoresistive film 100 had a ferromagnetic free layer whose magnetization direction was changed by an external magnetic field, a non-magnetic layer and a ferromagnetic pinned layer whose magnetization direction was fixed, and a multi-layered side magnetic shield composed of separate layers and soft magnetic layers (4 soft magnetic layers) which were arranged alternately was formed on both sides in the track width direction of the magnetoresistive film 100. The interval in the track width direction between the ferromagnetic free layer and the side magnetic shield layer was 10 nm.

Figure 15:
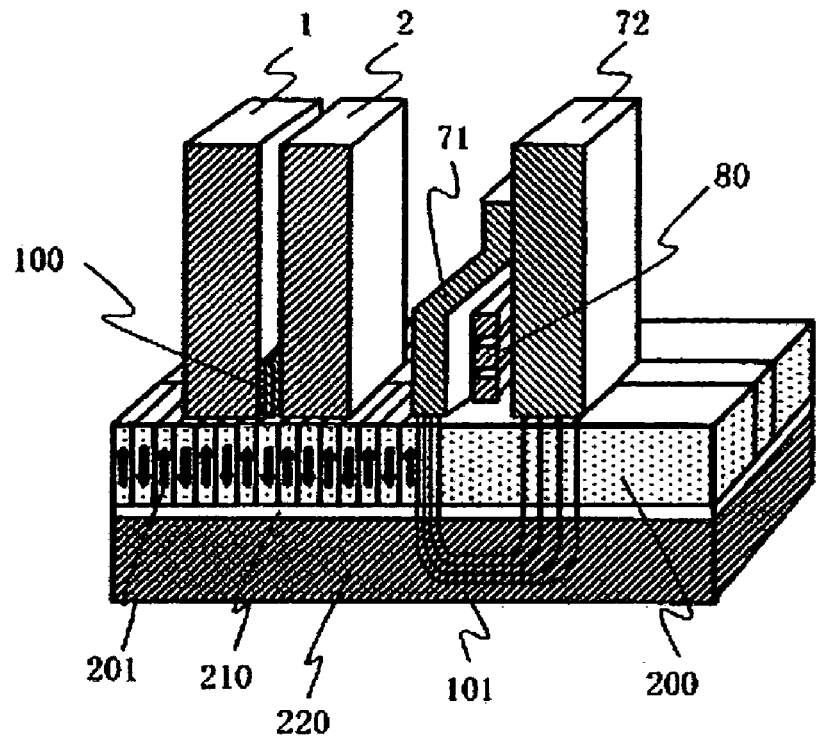
FIG. 15 shows a conceptual diagonally cross sectional view of the magnetic head shown in FIG. 14.

FIG. 15 is a schematic perspective sectional view of the magnetic head of this example. Coils 80 for generating a magnetic flux were formed between the main pole 71 and the return pole 72. By applying a write current having a desired pattern to these, a recording magnetic field 101 was generated in the magnetic gap between the main pole 71 and the return pole 72 to write magnetization information 201 to the magnetic recording layer 200 of the magnetic recording medium. To use the magnetic field generated in the magnetic head effectively for perpendicular recording, a 5 nm-thick non-magnetic separate film 210 and a 200 nm-thick soft magnetic underlayer 220 were formed under the magnetic recording layer 200. To read information, the magnetic field leaked from the magnetization information 201 written to the magnetic recording layer 200 is detected by the magnetoresistive film 100. A magnetic recording and playback drive having high recording density can be realized by using this magnetic head.

Figure 16:
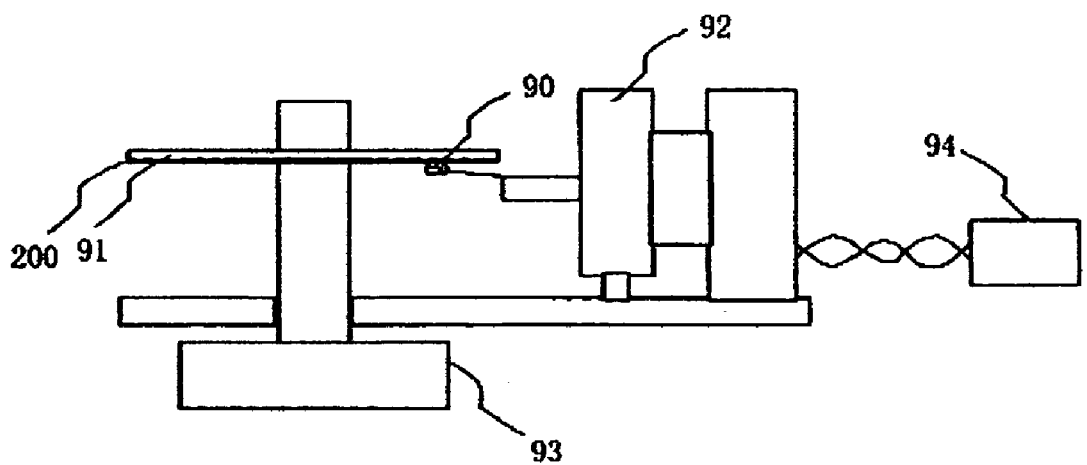
FIG. 16 shows an example of the system of the magnetic recording drive in accordance with another embodiment of the present invention.

FIG. 16 is a schematic diagram showing the constitution of the magnetic recording and playback drive of the present invention. This magnetic recording and playback drive comprises a disk-like magnetic recording medium 91 having a magnetic recording layer 200 for recording information magnetically, a spindle motor 92 for driving the magnetic recording medium, a head slider 90 mounting a magnetic head having a magnetic recording head and a magnetic read head, an actuator for driving the head slider 90 mounting the magnetic head, and a signal processing system 94 for processing a recording signal to the recording head and a read signal from the read head.

The magnetic recording medium 91 is driven by the spindle motor 93, and the head slider 90 is guided to the top of a track of the magnetic recording medium 91 by the actuator 92. The read head and the recording head formed on the head slider 90 are brought close to a predetermined recording position above the disk-like magnetic recording medium 91 by this constitution and moved relative to the magnetic recording medium 91 to write or read signals one by one. The actuator 92 may be a rotary actuator. The recording signal is recorded on the medium by the recording head through the signal processing system 94 and the output of the read head is obtained as a read signal through the signal processing system 94. Further, when the read head is moved above a desired recording track, the position of the read head above the track is detected by using high-sensitivity output from the read head and the actuator is controlled to position the head slider. In the diagram, one head slider 90 and one magnetic recording medium 91 are shown but a plurality of head sliders 90 and a plurality of magnetic recording media 91 may be used. The magnetic recording medium 91 may have a magnetic recording layer 200 on both sides to record information. When information is recorded on both sides of the disk, the head slider 90 is arranged on both sides of the disk.

At the time of recording and reading, the magnetic spacing between the magnetic recording layer of the magnetic recording medium and the magnetoresistive film was set to 15 nm. Thus, the interval in the track width direction between the ferromagnetic free layer of the magnetoresistive film and the side magnetic shield of the read head was made smaller than the magnetic spacing between the magnetic recording layer of the magnetic recording medium and the magnetoresistive film at the time of recording and reading, thereby making it possible to reduce the spread read width to about 26% of the track width. Since the spread read width could be made small, the malfunction of the drive caused by a cross talk that a signal component recorded on the adjacent recording track is read did not occur.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising:
   an upper magnetic shield;
   a lower magnetic shield; and
   a magnetoresistive film formed between the upper magnetic shield and the lower magnetic shield;
   wherein the magnetoresistive film has a domain control layer including an antiferromagnetic layer, a longitudinal biasing layer and a non magnetic separation layer, a first ferromagnetic layer whose magnetization direction is changed by an external magnetic field, a non-magnetic layer, and a second ferromagnetic layer whose magnetization direction is fixed; and
   wherein a pair of side magnetic shields, each of which is a multi-layered film including a plurality of soft magnetic layers and a plurality of separate layers arranged alternately, are formed on both sides in a track width direction of the magnetoresistive film and converge along a line formed by an upper corner of the magnetoresistive film and the upper magnetic shield.

2. The magnetic head according to claim 1, wherein the separate layers contain Ta, Cu, Ru, Cr, Ir or Rh, and two soft magnetic layers above and below each separate layer are magnetized in opposite directions.

3. The magnetic head according to claim 1, wherein the plurality of soft magnetic layers are antiferromagnetically and static magnetically coupled to one another at the end in the track width direction.

4. The magnetic head according to claim 1, wherein the plurality of soft magnetic layers are antiferromagnetically exchange coupled to one another through the separate layers.

5. The magnetic head according to claim 1, wherein each of the side magnetic shields comprises at least 3 soft magnetic layers.

6. The magnetic head according to claim 1, wherein the pair of side magnetic shields exist on an extension line in the track width direction of the first ferromagnetic layer.

7. The magnetic head according to claim 1, wherein the domain control layer for stabilizing the magnetic domain of the first ferromagnetic layer is formed on the first ferromagnetic layer through the non-magnetic separation layer.

8. The magnetic head according to claim 7, wherein the domain control layer is composed of a hard magnetic film.

9. The magnetic head according to claim 7, wherein the non-magnetic separation layer contains Ta, Cu, Ru, Cr, Ir or Rh.

10. The magnetic head according to claim 7, wherein an interval in the track width direction between the first ferromagnetic layer and the side magnetic shield is larger than an interval in a film thickness direction between the first ferromagnetic layer and the domain control layer.

11. The magnetic head according to claim 7,
    wherein an interval in the track width direction between the ferromagnetic free layer and each side magnetic shield is greater than a distance between the ferromagnetic free layer and the domain control layer.

12. The magnetic head according to claim 1, further comprising electric leads to apply a current in a thickness direction of the magnetoresistive film.

13. A magnetic recording and playback drive comprising a magnetic recording medium having a magnetic recording layer for recording information magnetically, a drive unit configured to drive the magnetic recording medium, a magnetic head including a magnetic recording head and a magnetic read head, an actuator configured to drive the magnetic head relative to the magnetic recording medium, and a signal processing system configured to process a signal from the magnetic head, wherein the magnetic read head comprises an upper magnetic shield, a lower magnetic shield, and a magnetoresistive film formed between the upper magnetic shield and the lower magnetic shield;

wherein the magnetoresistive film has a domain control layer including an antiferromagnetic layer, a longitudinal biasing layer and a non magnetic separation layer, a first ferromagnetic layer whose magnetization direction is changed by an external magnetic field, a non-magnetic layer, and a second ferromagnetic layer whose magnetization direction is fixed, and wherein a pair of side magnetic shields each of which is a multi-layered film including a plurality of soft magnetic layers and a plurality of separate layers arranged alternately, are formed on both sides in a track width direction of the magnetoresistive film and converge along a line formed by an upper corner of the magnetoresistive film and the upper magnetic shield.

14. The magnetic recording and playback drive according to claim 13, wherein an interval in the track width direction between the first ferromagnetic layer and each side magnetic shield is smaller than a magnetic spacing between the magnetic recording layer of the magnetic recording medium and the magnetoresistive film at the time of recording and reading.

15. The magnetic recording and playback drive according to claim 13, wherein the magnetic read head further comprises electric leads to apply a current in a thickness direction of the magnetoresistive film.

16. The magnetic recording and playback drive according to claim 13, wherein the domain control layer for stabilizing the magnetic domain of the first ferromagnetic layer is formed on the first ferromagnetic layer through the non-magnetic separation layer.

17. The magnetic recording and playback drive according to claim 16, wherein the magnetoresistive film further comprises a barrier layer and a ferromagnetic free layer disposed on the second ferromagnetic layer, and wherein an interval in the track width direction between the ferromagnetic free layer and each side magnetic shield is greater than a distance between the ferromagnetic free layer and the domain control layer.

18. The magnetic recording and playback drive according to claim 16, wherein the domain control layer is composed of a hard magnetic film.

19. The magnetic recording and playback drive according to claim 16, wherein an interval in the track width direction between the first ferromagnetic layer and the side magnetic shield is larger than an interval in a film thickness direction between the first ferromagnetic layer and the domain control layer.

* * * * *

UNITED STATES PATENT AND TRADEMARK OFFICE
CERTIFICATE OF CORRECTION

PATENT NO. : 7,599,151 B2
APPLICATION NO. : 10/977129
DATED : October 6, 2009
INVENTOR(S) : Hatatani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1151 days.

Signed and Sealed this

Twenty-eighth Day of September, 2010

David J. Kappos
*Director of the United States Patent and Trademark Office*